United States Patent [19]

Cler

[11] Patent Number: 4,989,399
[45] Date of Patent: Feb. 5, 1991

[54] CORN DETASSELING HEAD

[75] Inventor: Kenneth P. Cler, Camargo, Ill.

[73] Assignee: Paul's Machine and Welding Corporation, Villa Grove, Ill.

[21] Appl. No.: 356,522

[22] Filed: May 25, 1989

[51] Int. Cl.$^5$ ............................................. A01D 45/02
[52] U.S. Cl. ............................................ 56/63; 171/58
[58] Field of Search .................. 56/51, 63; 171/58, 61; 273/260

[56] References Cited

U.S. PATENT DOCUMENTS

| | | | |
|---|---|---|---|
| 3,736,730 | 6/1973 | Dobson | 56/63 |
| 3,769,782 | 11/1973 | Cler | 56/51 |
| 4,219,991 | 9/1980 | Bray | 56/63 |
| 4,423,717 | 1/1984 | Kahelin | 273/260 X |
| 4,712,534 | 12/1987 | Nozato | 273/260 X |

Primary Examiner—William P. Neuder
Attorney, Agent, or Firm—Wood, Phillips, Mason, Recktenwald & VanSanten

[57] ABSTRACT

A corn detasseling head which includes a frame having a pair of generally parallel shafts projecting rearwardly and downwardly from the frame, whereby the shafts are inclined upwardly in a forward direction relative to a normal forward direction to travel of the head. A pair of cylindrical elements are mounted respectively on the shafts for rotation about their axes relative to the frame, the cylindrical elements defining a detasseling nip. The shafts lie in a plane inclined downwardly and outwardly in a transverse direction relative to the normal forward direction of travel of the head. Therefore, an outward throw angle for the detasseling nip is defined to throw tassels outwardly away from the respective row of corn stalks from which they are being removed.

10 Claims, 2 Drawing Sheets

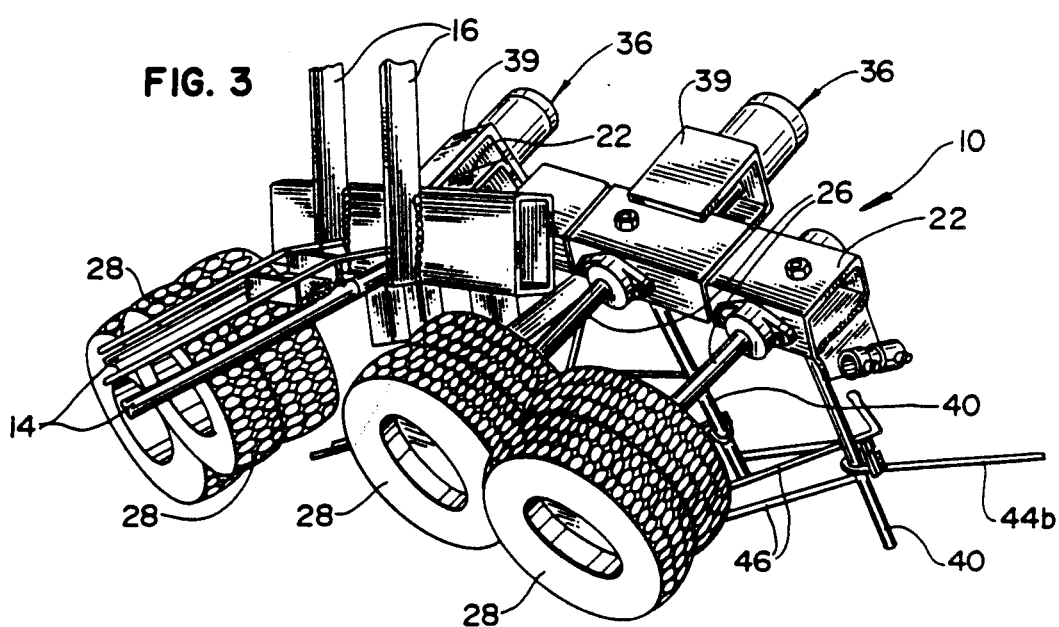
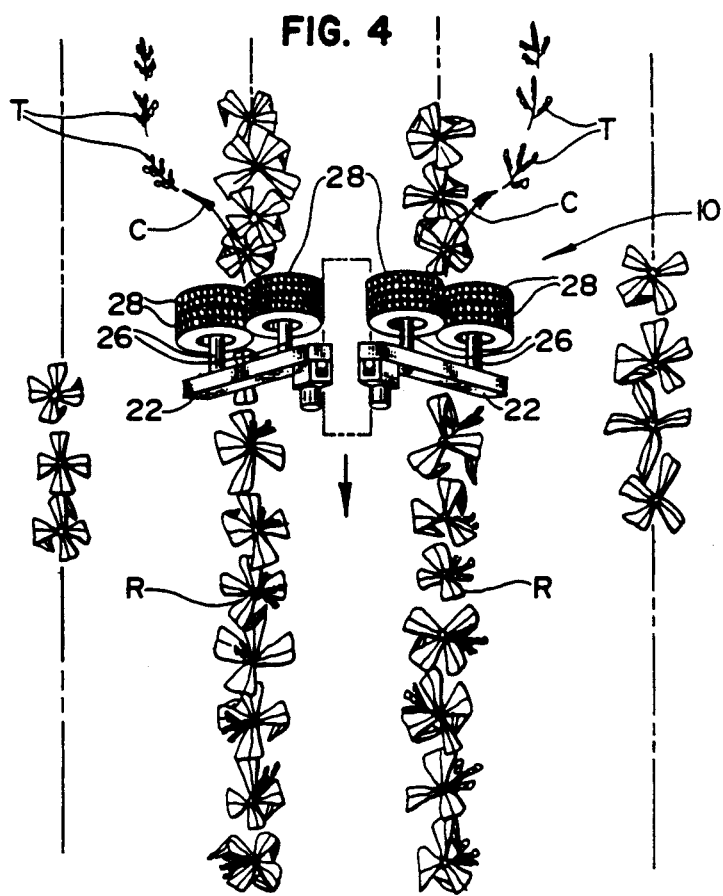

4,989,399

CORN DETASSELING HEAD

FIELD OF THE INVENTION

This invention generally relates to agricultural equipment and, particularly, to an implement for detasseling corn.

BACKGROUND OF THE INVENTION

The growing of hybrid seeds, particularly the staple grain of corn, long has been an important part of our agricultural business. In order to grow hybrid corn seeds, the tassels of the corn stalks must be removed so that the corn can be specially pollinated. Many years ago, detasseling corn was accomplished by a number of laborers on a suitable drawn vehicle. As the vehicle passed down the rows of corn stalks, the laborers simply manually pulled the tassels from the stalks.

As labor became expensive or scarce, various apparatus were designed for mechanically detasseling corn. Such apparatus ranged from implements employing rotary blades such as in Ackermann U.S. Pat. No. 3,025,653, to implement employing belts as in Spry U.S. Pat. No. 3,524,308, to implement employing wheels defining a nip for removing the tassels from the stalks as in Pfister U.S. Pat. No. 2,163,849.

A good example of a prior corn detasseling head which has proven quite successful is shown in U.S. Pat. No. 3,769,782 to Paul L. Cler, dated Nov. 6, 1973. In that patent, a construction is shown including a wheeled frame adapted to be propelled through a field. Mounted on the frame is a parallelogram linkage which, at one end, supports one or more detasseling heads. Each detasseling head includes a pair of tires arranged for rotation about parallel axes and in engagement with each other. The axes of rotation of the tires are at an angle in the range of 40° to 50° C. with respect to the horizontal and extend in a vertical plane encompassing the direction of movement of the vehicle. The tires are cleated and the cleats are such as to mesh when the tires are rotated to provide positive gripping action for tassels as the vehicle travels through a corn field. The tires are mounted on generally parallel shafts which are rotated by an appropriate drive means.

One of the problems encountered with using corn detasseling heads of the character described is that the tassels are thrown straight back onto the row of stalks which is being pulled or detasselled. Sometimes, the tassels fall to the ground as desired, but at other times the tassels are caught near the top of the corn stalk, which creates an undesirable condition. Various devices or attachments have been tried, with limited success, for knocking the tassels to the ground. This involves additions to an otherwise efficient and simple implement, or requires additional implements, per se.

This invention is directed to solving the problems described above by a simple concept of changing the head orientation and thereby providing a "throw angle" for the tassels away from the head and the row of corn stalks whereby the tassels fall to the ground between the rows in the field.

SUMMARY OF THE INVENTION

An object, therefore, of the invention is to provide a new and improved corn detasseling head.

In the exemplary embodiment of the invention, a corn detasseling head is shown to include a frame. A pair of generally parallel shafts are mounted on the frame, such that the shafts are inclined upwardly in a forward direction relative to a normal forward direction of travel of the head. A pair of cylindrical elements respectively are mounted on the shafts for rotation about their axes relative to the frame, the cylindrical elements defining a detasseling nip. The shafts lie in a plane inclined downwardly and outwardly in a transverse direction relative to the normal forward direction of travel of the head. This orientation of the shafts and their respective cylindrical elements thereby define an outward throw angle for the detasseling nip to effectively throw tassels outwardly away from the respective row of corn from which they are being removed.

In the preferred embodiment of the invention, the frame defines a central fore/aft axis of the head. Two pairs of the shafts and cylindrical elements are mounted on the frame, with one pair on opposite sides of the fore/aft axis to define oppositely directed throw angles for detasseling two rows of corn simultaneously and throwing the tassels outwardly in opposite directions. Preferably, each pair of shafts and cylindrical elements are mounted on separate frame members inclined downwardly and transversely outwardly relative to the direction of travel of the head. Separate motors are mounted on the two frame members. Therefore, the head can be easily varied to accommodate different row widths.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 3 is an oblique rear perspective view of the corn detasseling head; and

FIG. 4 is a schematic illustration showing the outward throw angles of the tassels away from the rows being detasselled.

DETAILED DESCRIPTION OF THE PREFERRED EMBODIMENT

Figure 1:
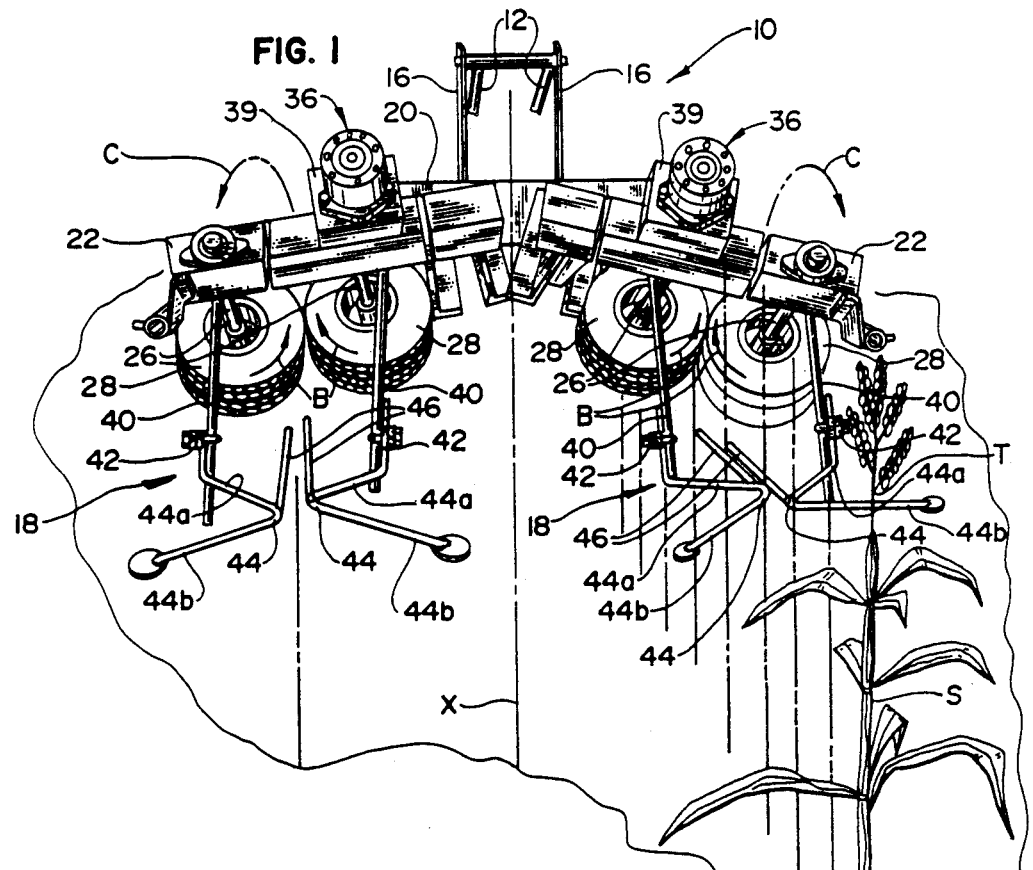
FIG. 1 is a front overhead perspective view of the corn detasseling head of this invention, shown somewhat schematically with a row of corn stalks.
Figure 2:
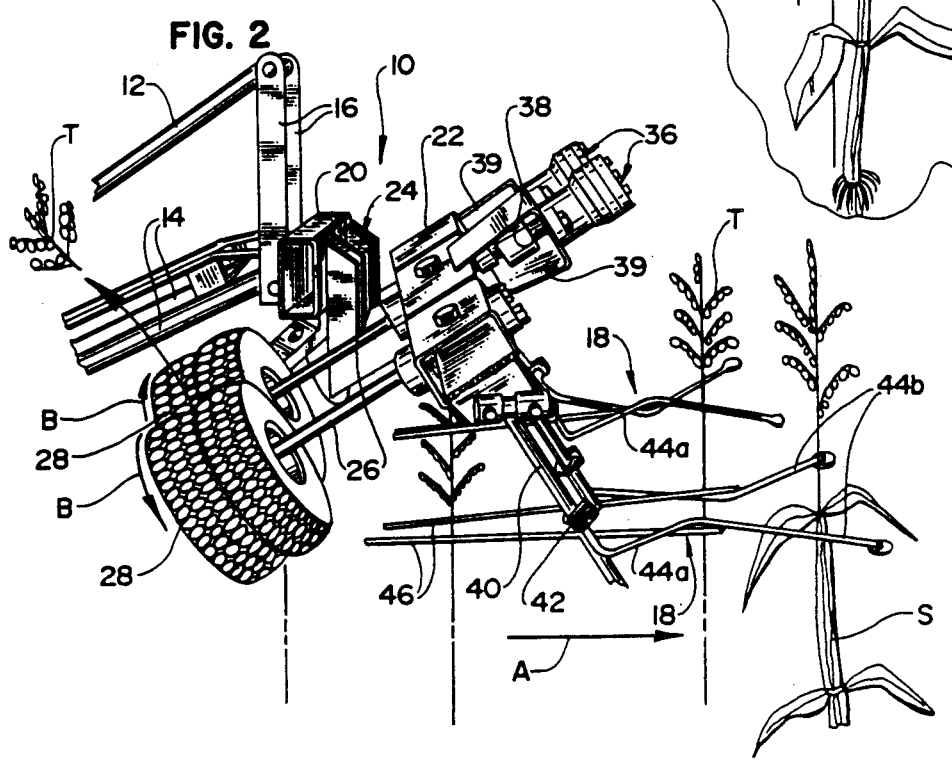
FIG. 2 is a side perspective view of the corn detasseling head.

Referring to the drawings in greater detail, a corn detasseling head made according to the invention is generally designated 10. The head is shown mounted to the front of a lift arm arrangement including upper and lower pairs of arms 12 and 14 (FIG. 2), respectively. At the forwardmost ends of the pairs of arms 12 and 14, there are provided a pair of upright members 16. As a result of this arrangement, arms 12 and 14 and upright members 16 define a parallelogram linkage which is movable in a vertical direction. This linkage is attached to the front of a tractor unit for moving corn detasseling head 10 forwardly through a corn field, generally parallel to the rows of corn stalks, as indicated by arrow "A"

in FIG. 2. Details of such a parallel linkage and mounting arrangement are shown in the aforesaid Cler U.S. Pat. No. 3,769,782 which is incorporated herein by reference. Suffice it to say, the parallelogram linkage preferably is movable about 45° in a vertical direction for selectively regulating the height of the detasseling head, but not its attitude, by changing the position of the parallelogram linkage. Stalk guide assemblies, generally designated 18, project forwardly of head 10. Therefore, as the height of the head is regulated, the stalk guide assemblies also are regulated to accommodate varying corn stalk heights or stages of growth.

Head 10 includes a frame having a generally horizontal box frame member 20 secured intermediate its ends to the lower ends of upright members 16 of the parallelogram linkage. A pair of additional elongated box frame members 22 are secured by bracket means, generally designated 24 (FIG. 2) to box frame member 20. These box frame members 22 mount or carry the major operative components of corn detasseling head 10, and the orientation of frame members 22 afford the novel actions of the head, as described hereinafter.

More specifically, each frame member 22 carries a pair of generally parallel shafts 26 which are journaled for rotation on the frame member. As best seen in FIGS. 2 and 3, shafts 26 are inclined upwardly in a forward direction relative to the normal forward direction of travel of the head, as indicated by arrow "A". In a reversing description, shafts 26 project downwardly and rearwardly of frame member 22, again as shown best in FIGS. 2 and 3.

A pair of tires or cylindrical elements 28 are fixedly mounted on the rear distal ends of shafts 26 for rotation about their axes relative to frame member 22. The cylindrical elements 28 on each pair of shafts 26 define a detasseling nip. Again, reference is made to Cler U.S. Pat. No. 3,769,782 for details of this know operation of the cylindrical elements. Suffice it to say, each cylindrical element may comprise an inflatable tire of conventional construction, the tires being of the type that include cleats. In fact, the cleats may be such as to be oriented with respect to each other so that they mesh and effectively grip the tassels.

Drive means are provided for rotating tires 28 in opposite directions, as indicated by arrows "B" in FIGS. 1 and 2. The drive means include separate hydraulic motors, generally designated 36, including rotating drive output shafts 38 (FIG. 2). The motors are mounted on the front of each frame member 22 by brackets 39. The motor speed may be varied with an adjustable hydraulic flow control. This variable speed allows the trajectory of the pulled tassel to be controlled so that the tassel is neither thrown too short a distance nor thrown so far that the tassel lands on a neighboring row of corn. The object is to throw the tassel so it may fall clear of everything and to the ground. In addition, the variable speed allows for the wheel rotation to be synchronized with the tractor speed. As the tractor speed increases, the operator will have the opportunity to increase the rotating speed of the puller wheels.

Each motor 36 is drivingly coupled to the respective pair of shafts 26 on the respective frame member 22 by some form of drive means housed within the box-shaped frame member. This may comprise a sprocket and drive chain connection as shown in the Cler patent, pulleys and belts, gears or other desired drive means appropriate for rotating the shafts in opposite directions to rotate tires 28 in the directions described above.

As best seen in FIG. 1, frame members 22 are elongated and project outwardly from a central fore/aft axis "X" of the head. The frame members are inclined downwardly and transversely outwardly relative to the normal forward direction of travel of the head. This can be seen clearly in the side depiction of FIG. 2. The result of this orientation of the frame members, shafts 26 and tires 28 is best seen in FIGS. 2 and 3. It can be seen that each pair of shafts lie in a plane inclined downwardly and outwardly in a transverse direction. Consequently, the detasseling nip between the tires is skewed.

More particularly, referring back to FIG. 1, with the above-described description of frame members 22 and shafts 26, it can be seen that the nip between the tires defines a throw angle for the tassels in a direction generally as indicated by arrows "C". It can be seen that these throw angles are outwardly away from the center of the head and, consequently, outwardly away from the respective row of corn stalks "S" from which tassels "T" are being removed. The result is shown schematically in FIG. 4 where it can be seen that the tassels "T" are thrown outwardly away from their respective rows R and the tassels will fall between the rows rather than back on top of the stalks as is prevalent with prior detasseling heads. As seen in FIGS. 2 and 3, with shafts 26 projecting downwardly and rearwardly of their respective frame member 22, the actual throw angle defined by the invention is a combination of the outward angle of arrows "C" in FIG. 1, and the rear angle defined by the orientation of the shafts and the tires.

Each stalk guide assembly 18 includes a pair of forwardly and downwardly extending rods 40, as best seen in FIG. 1, secured to the respective frame member 22 on opposite sides of the nip between tires 28. Each rod 40 receives a sleeve-like clamp 42 which may be moved along the length of the rod and secured in any position thereon. The clamps, in turn, mount guides 44 formed of rods and each including an inwardly directing portion 44a and an outwardly directing portion 44b. Another rod section 46 projects rearwardly from the elbow between rod portions 44a,44b and may be secured thereto, as by welding. As a result, as the head progresses through a corn field and down the rows thereof, stalks will be guided inwardly to the nip between detasseling tires 28 by the guide portions 44b and rod sections 46 at which time they will be firmly grasped by the meshing cleats on tires 28 and pulled upwardly, thereby to completely separate the tassel at its base from the stalk. Of course, if the height of the corn stalks vary along the length of the row, easy adjustment may be made through the parallelogram linkage described above. The removed tassels are thrown rearwardly and outwardly in the direction of arrows "C" (FIG. 4) whereupon, due to the novel throw angle, the tassels will fall to the ground between the rows of stalks.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A corn detasseling head, comprising:
   a frame;

a pair of generally parallel shafts on the frame, the shafts extending in a fore and aft direction relative to a normal forward direction of travel of the head;

a pair of cylindrical elements respectively mounted on the shafts for rotation about their axes relative to the frame, the cylindrical elements defining a detasseling nip; and wherein the shafts lie in a plane inclined downwardly and outwardly in a transverse direction relative to the normal forward direction of travel of the head to thereby define an outward throw angle for the detasseling nip to throw tassels outwardly away from the respective row of corn stalks from which they are being removed.

2. The corn detasseling head of claim 1 wherein said frame defines a central fore/aft axis of the head, and including two pairs of said shafts and cylindrical elements with one pair on opposite sides of the fore/aft axis to define oppositely directed throw angles for detasseling two rows of corn and throwing the tassels outwardly in opposite directions.

3. The corn detasseling head of claim 2, including separate drive means mounted on the frame for respectively rotating the two pairs of shafts.

4. The corn detasseling head of claim 3 wherein said pairs of shafts and cylindrical elements and their respective drive means are mounted respectively on a pair of elongated box frame members inclined downwardly and transversely outwardly relative to the central fore/aft axis.

5. The corn detasseling head of claim 1 wherein said shafts project downwardly and rearwardly of the frame to locate the cylindrical elements behind the frame relative to the normal forward direction of travel of the head.

6. The corn detasseling head of claim 1 wherein said pair of shafts and cylindrical elements are mounted on an elongated frame member inclined downwardly and transversely outwardly relative to the normal forward direction of travel of the head.

7. The corn detasseling head of claim 1 wherein said shafts are inclined upwardly in a forward direction relative to the normal forward direction of travel of the head.

8. A corn detasseling head, comprising:

a pair of frame members extending outwardly relative to a central fore/aft axis of the head;

a pair of generally parallel shafts on each frame member, the shafts extending generally parallel to said axis;

a pair of cylindrical elements respectively mounted on each pair shafts for rotation about their axes relative to the frame, the cylindrical elements defining a detasseling nip; and separate motor means on each frame member for oppositely rotating the respective cylindrical elements about their respective axes.

9. The corn detasseling head of claim 8 wherein said shafts extend downwardly and rearwardly of the frame members, and the drive means include motor means mounted on the front of the frame members.

10. The corn detasseling head of claim 9 wherein said frame members each comprises an elongated box frame member for housing connecting means between the motor means and the shaft.

* * * * *